(12) United States Patent
Alvarez et al.

(10) Patent No.: US 7,426,456 B2
(45) Date of Patent: *Sep. 16, 2008

(54) OPTIMAL OPERATION OF A POWER PLANT

(75) Inventors: Eduardo Gallestey Alvarez, Tägerig (CH); Alec Stothert, Ennetbaden (CH); Marc Antoine, Gretzenbach (CH); Steve Morton, Neuenhof (CH)

(73) Assignee: ABB Research Ltd, Zurich (CH)

( * ) Notice: Subject to any disclaimer, the term of this patent is extended or adjusted under 35 U.S.C. 154(b) by 554 days.

This patent is subject to a terminal disclaimer.

(21) Appl. No.: 10/298,573

(22) Filed: Nov. 19, 2002

(65) Prior Publication Data

US 2003/0100974 A1    May 29, 2003

(30) Foreign Application Priority Data

Nov. 29, 2001    (EP) ................... 01811159

(51) Int. Cl.
G06F 17/10    (2006.01)
(52) U.S. Cl. ........................................... 703/2
(58) Field of Classification Search ............ 703/2; 700/286
See application file for complete search history.

(56) References Cited

U.S. PATENT DOCUMENTS

| 5,347,466 | A | 9/1994 | Nichols et al. | |
| 5,886,895 | A | 3/1999 | Kita et al. | |
| 6,102,958 | A | * 8/2000 | Meystel et al. | 703/2 |
| 6,169,927 | B1 | 1/2001 | Schönthal et al. | |
| 6,207,936 | B1 | * 3/2001 | de Waard et al. | 219/497 |
| 7,058,552 | B2 | * 6/2006 | Stothert et al. | 703/2 |

OTHER PUBLICATIONS

Jason W. Rupe, "Optimal-Maintenance Modeling on Finite Time with Technology Replacement and Changing Repair Costs", 2000 Proceedings Annual Reliability and Maintainability Symposium pp. 269-275.
C. Wang et al., "Optimal Generation Scheduling wih Ramping Costs", IEEE Transactions on Power Systems, vol. 10, No. 1, Feb. 1995, Scottsdale, Arizona, pp. 60-67.

(Continued)

Primary Examiner—Kamini S Shah
Assistant Examiner—Saif A Alhija
(74) Attorney, Agent, or Firm—Buchanan Ingersoll & Rooney PC

(57) ABSTRACT

In a method and computer program product for optimal operation of a power plant and a power plant optimising system an optimisation mode (1) minimises a cost function (J[u],J[P]) that comprises a deviation of lifetime of plant components (LTp($\tau$)) from a desired nominal lifetime trajectory (LTn($\tau$)). This is done by, at a given time, determining future values of input values (u($\tau$),P($\tau$)) such as control values (P($\tau$)) or process values (u($\tau$)) to the plant and simulating, in a simulation modulate (2), the behaviour of the plant up to a given future time. Corresponding lifetime values are determined in the simulation, and incorporated in an objective function. The optimisation module (1) minimises the cost function (J[u],J[P]) by varying the input values (u($\tau$),P($\tau$)). As a result, it is possible to operate the plant such that component lifetime (LTp($\tau$)) follows the desired trajectory (LTn($\tau$)).

11 Claims, 1 Drawing Sheet

OTHER PUBLICATIONS

Ross Baldick, "The Generalized Unit Commitment Problem", IEEE Transactions on Power Systems, vol. 10, No. 1, Feb. 1995.

Vinayaga Sarma et al., "System Life Cycle Cost Minimization—A Simulation Approach", Proceedings of the 3rd International Conference On Modeling and Simulation, Oct. 29-31, 1997, Victoria University of Technology—Melbourne, Australia, XP-000893121, pp. 132-137.

O. Zaviska et al., "Siemens Optimizes Start-up Sequences in a Power Plant Unit—New Unit Start-up Simulator Reduces Costs", VGB PowerTech Jul. 2001, XP-001073395, pp. 36-38.

L. T. Biegler, "Advances in Nonlinear Programming Concepts for Process Control," J. Proc. Cont., 1998, pp. 301-311, vol. 8, Nos. 5-6, Elsevier Science Ltd., Great Britain.

S.J. Qin et al., "An Overview of Nonlinear Model Predictive Control Applications," Progress in Systems and Control Theory, 2000, 25 pages, vol. 26, Birkäuser Verlag Bael/Switzerland.

L. T. Biegler, "Efficient Solution of Dynamic Optimization and NMPC Problems," Progress in Systems and Control Theory, 2000, 26 pages, vol. 26, Birkäuser Verlag Bael/Switzerland.

* cited by examiner

OPTIMAL OPERATION OF A POWER PLANT

FIELD OF THE INVENTION

The invention relates to the field of process control, in particular to a method and computer program for optimal operation of a power plant, and a power plant optimising system as described in the preamble of claims 1, 11 and 12, respectively.

BACKGROUND OF THE INVENTION

In known methods and systems for optimal operation of a power plant, plant operation is controlled by control values generated by a control system and is optimised in order to minimise fuel costs while achieving nominal required output values for produced power and process steam. This is done by, at a given time, determining future values of control values and simulating a behaviour of the plant up to a given future time. From the simulation, fuel costs are determined and an objective function comprising the fuel costs and costs for buying power from another source is computed. In order to determine optimal control values, the control values are varied and the simulation is repeated until a minimum of the objective function is found. The above procedure is also called "Unit commitment problem" (UCP). A mathematical treatment is given in "The Generalised Unit Commitment Problem", Ross Baldick, IEEE Transactions on Power Systems, 10(1):465-475, February 1995. The optimisation is constrained by the fact that predetermined operating limits of the plant may not be exceeded.

"Optimal-Maintenance Modelling on Finitic Time with Technology Replacement and Changing Repair Costs", Jason W. Rupe, IEEE 2000 Proc. Annual Reliability and Maintainability Symposium, shows a method to determine when to replace or maintain components in a system with limited lifetime.

"Optimal Generation Scheduling with Ramping Costs", C. Wang, and S. Shahidehpour, IEEE Trans. on Power Systems, Vol. 10, no. 1, pp 60-67. February 1995, shows how to include an effect of fatigue stress and a resulting steam turbine rotor depreciation in scheduling algorithms for minimising operation cost.

SUMMARY OF THE INVENTION

It is an object of the invention to create a method and computer program for optimal operation of a power plant and a power plant optimising system of the type mentioned initially that allow a better combination of technical and economical considerations.

These objects are achieved by a method and computer program for optimal operation of a power plant and a power plant optimising system according to the claims 1, 11 and 12.

According to the invention, in a method and computer program for optimal operation of a power plant and a power plant optimising system according to the independent claims, a lifetime of plant components is determined when simulating a future behaviour of the plant, and a cost function to be minimised by the optimisation comprises a deviation of said lifetime from a nominal lifetime trajectory.

In this way, it is possible to prescribe a lifetime trajectory for a plurality of plant components and to operate the plant so that one or more components reach the end of their lifetime, or a state in which maintenance is necessary, at a predetermined time. It is therefore no longer necessary to schedule maintenance according to planned or expected plant operation, but plant operation can be modified in order to control when to perform maintenance.

In a preferred variant of the invention, plant process variables representing internal states of the plant are determined in the simulation and a difference between said plant process variables and nominal process variables is included in the cost function. The nominal process values are determined in order to reach given production and/or economic goals.

Further preferred embodiments are evident from the dependent patent claims.

BRIEF DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION OF THE INVENTION

Figure 1:
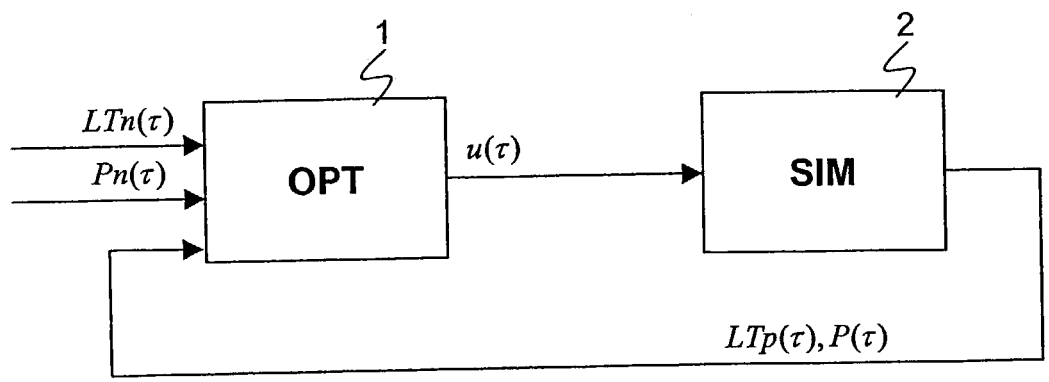
FIG. 1 shows a block diagram corresponding to the invention.

FIG. 1 shows a block diagram corresponding to the invention. An optimisation module 1 is provided with a nominal or desired lifetime trajectory $LTn(\tau)$ and with nominal or desired process variables $Pn(\tau)$. The optimisation module 1 generates power plant operating parameters or control values $u(\tau)$ that are input to a simulation module 2. The simulation module 2 comprises a simulation model of an actual power plant 3 and determines values for a power plant's internal states or process variables $P(\tau)$, and values of a lifetime trajectory $LTp(\tau)$ of plant components. The values determined by the simulation module 2 are input to the optimisation module 1.

The values I, $Tn(\tau), LTP(\tau), Pn(\tau), P(\tau), u(\tau)$ mentioned above are, in general, vectors that change over time, i.e. each vector represents a trajectory in a multidimensional space. For example, $LTp(\tau)$ represents a lifetime trajectory for a plurality of pressure vessels, pipes, turbines, pumps etc. over the next hours, days or months. $P(\tau)$ represents e.g. steam pressures and temperatures and their gradients, or metal temperatures of critical components.

The control values $u(\tau)$ represent plant input or operation parameters that are used to control the plant, such as valve, pump or guide vane set points or actual positions, or set points for local controllers of pressure, level, temperature, fuel flow or steam mass flow. From a trajectory of control values $u(\tau)$ that is given for a time interval from a present time t to a future time t+T, where T is called "prediction horizon" or "optimisation horizon", the simulation model determines a trajectory of the state of the power plant, i.e. the values of a plurality of variables that represent the state of the plant as it changes with time. From the state trajectory, trajectories $LTp(\tau), P(\tau)$ for the values output by the simulation module 2 are determined for said time interval. In a preferred embodiment of the invention, the simulation model is a dynamic model of the power plant and its components.

The nominal process variables $Pn(\tau)$ are determined from process knowledge, taking into account a computer model of process physics and preferably optimising process efficiency and/or another optimisation criterion such as reliability. They are either predetermined or computed online during plant operation.

The lifetime trajectory $LTp(\tau)$ of plant components represents a remaining lifetime for a plurality of plant components. A lifetime value for a component may, depending on convention, either represent a "remaining lifetime" or a "consumed lifetime". The latter are sometimes denoted as "equivalent operating hours" (EOH). Whichever convention is adopted does not affect the invention: A remaining lifetime decreases steadily from a total lifetime down to or beyond zero, while a consumed lifetime increases steadily up to and beyond the total lifetime. The total lifetime is the time span that the component is designed to be in operation under given nominal conditions. Lifetime boundary values determine when servicing or replacement of a component should tape place— at the latest, when remaining lifetime is zero or less. After such servicing or replacement, the component's lifetime is reset accordingly.

Plant components are e.g. pressurised vessels, pipes or turbine blades. They are designed to withstand normal operating conditions for a given amount of time, i.e. for their total lifetime under nominal conditions. Subjecting a component to more severe operating conditions such as higher temperatures or temperature gradients increases component degradation and reduces component lifetime. This in turn increases long term costs for operating the power plant. Nevertheless it may be advantageous to determine nominal process values $Pn(\tau)$ that exceed normal operating limits are incur the corresponding operating losses if gains from production are sufficiently high. According to the invention the corresponding change in lifetime is also taken into account and controlled by operating the plant accordingly.

The lifetime trajectory $LTp(\tau)$ is computed from models associated with various plant components, such as the following models, which are well known to one versed in the art:

Microcrack growth rate models for components operating at elevated temperatures, such as boiler pressure parts, steam pipes and steam turbine rotors. See for example "Life Assessment Technology for Fossil Power Plants", R. Viswanathan, Proc. American Power Conf., Vol. 57-III: 1749-1768, 1995 and "A Lifetime Prediction Model for Thermomechanical Fatigue based on Microcrack Propagation", M. P. Miller et al., ASTM STP 1186, 1993, pp. 35-49.

Corrosion, oxidation, and erosion models based on extensions to microcrack growth models as described in "Corrosion Fatigue: Mechanics, Metallurgy, Electrochemistry, and Engineering", T. Crooker and B. Leis editors, ASTM 1983.

Mechanical and thermomechanic stress models to determine stresses created in plant components, e.g. stresses in a steam turbine rotor shaft due to load oscillations and/or steam temperature changes.

A Lifetime $LT_i(t)$ is associated with an i'th component, for example, a pressurised vessel subject to constant and/or cyclic stresses. For such a vessel, $LT_i(t)$ is, for example, computed from a crack growth model that determines an average current crack size $\alpha_i(t)$. The lifetime is determined as $$Lt_i(t)=k(\alpha_{crit}-\alpha_i(t))$$

where is $\alpha_{crit}$ a critical crack size and k is a normalising coefficient. When $LT_i(t)$ reaches zero or becomes negative, the component is assumed to have reached or exceeded its lifetime.

Any other method for calculating component lifetime from operating conditions may be used, such as the ones shown in the following publications of Deutscher Dampfkessel-Ausschuβ, "TRD 300: Calculation of boiler strength", "TRD 301: Cylindrical shells under internal pressure", "TRD 508 Annex 1: Additional tests on components—methods for the calculation of components having time dependent design strength values", 1978-79.

In the inventive method, the following steps are performed a) The optimisation module 1 determines the trajectory of plant control values $u(\tau)$ from the present time t from a predetermined duration T and transmits said plant control values $u(\tau)$ to the simulation module 2. The first time that this step is executed, plant control values are e.g. set to constant values for the duration T or are determined from stored standard trajectories corresponding to a given operating condition such as a plant start-up or a load change. Later executions of this step preferably use a variation of the plant control values $u(\tau)$ of an earlier step.

b) The plant model incorporated in the simulation module 2 determines from the trajectory of control values $u(\tau)$, by simulation of the power plant behaviour, a trajectory of the state of the power plant. From said state, corresponding trajectories of process variables $P(\tau)$ are determined. Control values are, for example, valve positions, motor speeds, electric power flow, etc. Process variables $P(\tau)$ represents the physical process of main interest. In the case of a power plant this is the water/stream cycle with process variables such as mass flows, temperatures, pressures, fluid levels etc. Some process variables $P(\tau)$ are identical to states of the power plant in the control sense, others are computed from the states by linear or non-linear and/or dynamic submodels. From the process variables $P(\tau)$, simulated values of lifetime trajectory $LTp(\tau)$ of plant components are computed.

c) A cost function $J[u]$ is computed as an integral of an objective function that comprises a deviation of the lifetime trajectory $LTp(\tau)$ from the given desired lifetime trajectory $LTn(\tau)$. In a preferred embodiment of the invention, this cost function $J[u]$ is defined as the functional $$J[u] = \int_t^{t+T} \| R_{LT}(\tau)(LTn(\tau) - LTp(\tau)) \| \, d\tau,$$

where $R_{LT}$ is a weighting matrix. It determines a relative influence of the magnitude of components $\Delta LT_i(t)$ of the difference between nominal and simulated actual lifetime vectors $LTn(\tau),LTp(\tau)$. The norm $\|\ldots\|$ used in the integral is any norm, for example a 2-norm or an infinity norm.

In a preferred embodiment of the invention, the above objective function also includes a deviation of the process variables $P(\tau)$ from the desired nominal process variables $Pn(\tau)$. In this embodiment, the cost function $J[u]$ is preferably defined as $$J[u] = \int_t^{t+T} \| R_{LT}(\tau)(LTn(\tau) - LTp(\tau)) \| + \| R_P(\tau)(Pn(\tau) - P(\tau)) \| \, d\tau,$$

where $R_P$ is a corresponding weighting matrix for process variables. It allows prescription of the relative importance of deviations of individual variables with respect to one another and to lifetime values. Both $R_{LT}$ and $R_P$ are time dependent and positive semidefinite. If a 2-norm is used, the function is $$J[u] = \int_{t}^{t+T} \| R_{LT}(\tau)(LTn(\tau) - LTp(\tau)) \|^2 + \| R_p(\tau)(Pn(\tau) - P(\tau)) \|^2 \, d\tau,$$

d) Steps a) through c) are repeated iteratively, with the optimisation module varying the trajectory of plant control values $u:[t,t+T] \mapsto R^n$ until an optimised lower value of the cost function J[u] is arrived at. As the trajectories $LTp(\tau), P(\tau)$ depend upon plant control values $u(\tau)$, the optimisation routine finds a trajectory of control values $u(\tau)$ or strategy $u^* :[t,t+T] \mapsto R^n$ that minimises the cost function J[u]. Appropriate optimisation and simulation methods are well known from the field of model predictive control (MPC).

In another preferred embodiment of the invention, the cost function in the steps shown above is expressed as J[P] in terms of the process variables, e.g. as $$J[P] = \int_{t}^{t+T} \| R_{LT}(\tau)(LTn(\tau) - LTp(\tau)) \| + \| R_p(\tau)(Pn(\tau) - P(\tau)) \| \, d\tau$$

and the optimisation according to step d) determines $$P^* = \arg\min J[P]$$

with the strategy $P^* :[t,t+T] \mapsto R^q$ minimising the cost function J[P]. In this embodiment, the optimisation determines the optimal trajectory $P^*(\tau)$ of process variables. The task of determining corresponding control values $u(\tau)$ that achieve the optimal trajectory $P^*(\tau)$ of process variables is left achieved by a control function or control system for of the plant. This function or system may be considered to reside, in the structure according to the figures, in either the simulation (2) or in the optimisation (1) module.

In the case in which the cost function J[u] is minimised the plant control values $u(\tau)$ are considered to be input values that are varied for the simulation and by optimisation. When the cost function J[P] is minimised, then the process variables $P(\tau)$ are considered to be said input values.

In a further preferred embodiment of the invention, the cost function incorporates a term that represents a difference between the lifetime vector $LTp(T_E)$ and the nominal lifetime vector $LTn(T_E)$ at a given predetermined end time $T_E$, weighted with an appropriate weighting matrix $R_E$. For example, the cost function J[u] or J[P] is $$\int_{t}^{t+T} \| R_{LT}(\tau)(LTn(\tau) - LTp(\tau)) \|$$
$$+ \| R_p(\tau)(Pn(\tau) - P(\tau)) \| \, d\tau + \| R_E(LTn(T_E) - LTp(T_E)) \|.$$

This term realises a soft constraint that penalises not reaching the nominal lifetime vector $LTn(T_E)$ at time $T_E$.

In another preferred embodiment of the invention, this penalty is achieved by the time dependency of $R_{LT}$, i.e. by having relatively large entries in $R_{LT}$ at the time $T_E$. If following the exact trajectory of the nominal lifetime vector $LTn(\tau)$ is not important most of the time, the entries in $R_{LT}$ are set to relatively small values for these times.

In yet a further preferred embodiment of the invention, the optimisation is subject to hard constraints on one or more of the plant control values $u(\tau)$ and/or of the process variables $P(\tau)$.

In another preferred embodiment of the invention, the nominal lifetime vector $LTn(\tau)$ is determined such that the nominal lifetime consumption of components is co-ordinated, with a plurality of given components reaching an associated predetermined lifetime limit value at the same time. For example, if maintenance of a given component such as a boiler involves shutting down other components such as pumps, tanks etc. simultaneously, then maintenance of these other components may take place when the boiler is shut down. Accordingly, the nominal lifetime of these other components is scheduled to reach or at least allowed by choice of weighting values to reach an associated lifetime limit value at essentially the same time as the boiler.

The features of the above preferred embodiments can be varied and combined in a manner obvious to one versed in the art. For example, one embodiment comprises a cost function J[P] using infinity-norms and incorporating a soft constraint on the lifetime vector $LTp(T_E)$ at the end time $T_E$.

The optimisation step c) involves the problem of how to find the optimal solution efficiently, since the search space determined by the plurality of plant control values and the duration T is large. Standard optimisation procedures based on e.g. dynamic programming or the Hamilton-Jacobi method may be used, or dedicated solutions as described, for example, in "The Generalised Unit Commitment Problem", Ross Baldick, IEEE Transactions on Power Systems, 10(1): 465-475, February 1995. If the cost function incorporates a hard constraint on the lifetime at the end time, then a solution to the corresponding optimisation problem is found e.g. by the Pontryaguin maximum principle. Alternative optimisation routines based on brute force methods coupled with complexity reducing heuristics are also possible, for example, simulated annealing and genetic algorithms.

In a preferred embodiment of the invention, at the time t, the control strategy, i.e. one or more of the future values $u :[t,t+T] \mapsto R^n$ corresponding to optimal plant operation and/or corresponding values of the optimal trajectory $P^*(\tau)$ of process variables are displayed graphically to an operator, providing her with guidance for controlling the plant.

Figure 2:
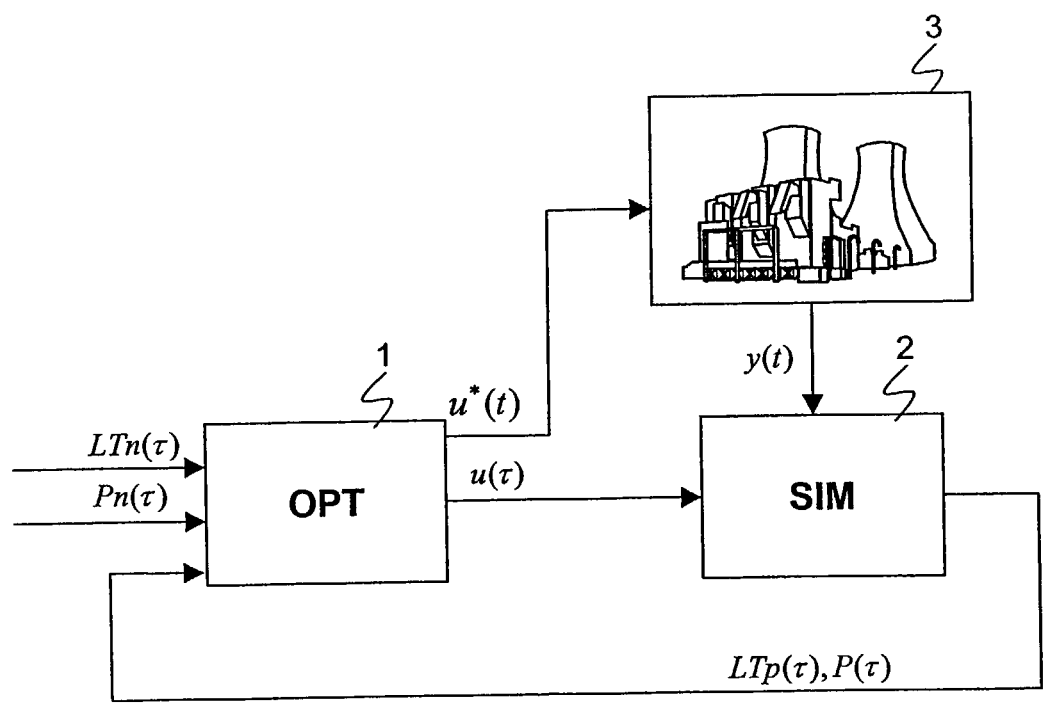
FIG. 2 shows a block diagram corresponding to a preferred embodiment of the invention.

FIG. 2 shows a block diagram corresponding to another preferred embodiment of the invention, in which, at time $\tau$, an optimal control value $u^*(t)$ is applied to the actual power plant 3, resulting in automatic optimised plant operation. Preferably, measured plant values y(t) of the plant are input to the simulation module 2 in order to update the simulation model. Appropriate modelling and model update techniques are well known from the fields of optimal control and model predictive control. In particular, receding horizon control techniques give useful results. The power plant is, for example, a gas turbine, a combined cycle power plant, or of a boiler-turbine-generator type.

A computer program product according to the invention comprises a computer readable medium, having thereon: computer program code means to make, when said program is loaded in a computer that is operationally connected to a power plant, the computer execute the method according to the invention. A computer program according to the invention comprises said computer program code.

A power plant optimising system for optimal operation of a power plant according to the invention comprises data processing means such as control computers and hardware and/or software modules, including:

a) a simulation module 2 that is configured to determine, from a trajectory of input values, by simulation of the power plant's behaviour, corresponding trajectories of process variables $P(\tau)$, and b) an optimisation module 1 that is configured to determine a plurality of trajectories of input values and to determine a value of a cost function as an integral of an objective function, which objective function comprises at least one trajectory determined by the simulation module 2.

The simulation module 2 is configured to determine, from the trajectory of input values, a trajectory representing a lifetime $LTp(\tau)$ of plant components, and the objective function comprises a difference of said lifetime $LTp(\tau)$ from a nominal lifetime trajectory $LTn(\tau)$.

In a preferred embodiment of the power plant optimising system, the objective function comprises a difference between the trajectory of process variables $P(\tau)$ and a trajectory of associated nominal process variables $Pn(\tau)$. A further preferred embodiment of the power plant optimising system comprises means for displaying at least part of the trajectory of input values to an operator and/or means for using at least part of said values to control the actual plant (3).

The invention allows the operator or an automatic controller to incorporate not only short-term financial considerations into a plant operating strategy, but also allows scheduling and consideration of the influence of lifetime consumption on components, in order to meet and/or optimise planned replacement and maintenance schedules.

List of designations
  1 optimisation module
  2 simulation module
  3 actual power plant
  $u(\tau)$ control values
  $u^*(t)$ optimal control values
  $LTp(\tau)$ lifetime trajectory
  $LTn(\tau)$ desired or nominal lifetime trajectory
  $P(\tau)$ process variables
  $Pn(\tau)$ desired or nominal process variables
  $y(t)$ measured plant values
  $R_{ILT}, R_P, R_E$ weight matrices

The invention claimed is:

1. A method for optimal operation of a power plant comprising a plurality of physical plant components, where the method comprises the steps of:

a) determining a trajectory of input values ($u(\tau)$);
  b) determining, by simulation of the power plant behaviour, from the trajectory of input values ($u(\tau)$), corresponding trajectories of process variables ($P(\tau)$);
  c) computing a cost function ($J[u], J[P]$) as an integral of an objective function that comprises at least one trajectory determined in the simulation;
  d) iteratively repeating steps a) through c) with an optimisation module varying the trajectory of input values ($u(\tau)$) until, for a trajectory of optimal control values ($u^*(t)$), an optimised lower value of the cost function ($J[u], J[P]$) is arrived at,
  wherein in step b), a lifetime trajectory $LTp(\tau)$ of individual physical plant components is determined from the trajectory of input values ($u(\tau)$) and wherein, in step c), the cost function ($J[u], J[p]$) comprises the term:

$$\int_t^{t+T} \| R_{LT}(\tau)(LTn(\tau) - LTp(\tau)) \| \, d\tau,$$

where $LTn(\tau)$ is a nominal lifetime trajectory of the individual physical plant components, $R_{LT}$ is a weighting matrix for determining a relative influence of each of the physical plant components, t is a present time, and T is a predetermined duration; and e) applying at least one optimal control value ($u^*(t)$) from an optimisation module to the power plant to influence lifetime consumption of the individual physical plant components.

2. Method according to claim 1, wherein the input values are control values, the trajectories of process variables are determined from the control values by simulation of the power plant's behaviour, and the optimisation step finds a trajectory of control values that minimises the cost function.

3. Method according to claim 1, wherein the input values are the process variables and the optimisation step finds a trajectory of process variables that minimises the cost function.

4. Method according to claim 1, wherein in step c) the objective function comprises a difference between the trajectory of process variables and a trajectory of associated nominal process variables.

5. Method according to claim 1, wherein in step c) the cost function incorporates a term that represents a difference between the lifetime vector and the nominal lifetime vector at a given predetermined end time.

6. Method according to claim 1, wherein in step c) the optimisation is subject to hard constraints on one or more of the plant control values and/or of the process variables.

7. Method according to claim 1, wherein at least part of the trajectory of input values corresponding to the optimised cost is displayed to an operator.

8. Method according to claim 1, wherein at least part of the trajectory of input values corresponding to the optimised cost is used to control the actual plant.

9. Method according to claim 1, wherein the cost function comprises the term.

10. A computer-readable storage medium containing instructions for causing a computer to execute a method, the method comprising:

a) determining a trajectory of input values ($u(\tau)$);
  b) determining, by simulation of the power plant behaviour, from the trajectory of input values ($u(T)$), corresponding trajectories of process variables ($P(T)$);
  c) computing a cost function ($J[u], J[P]$) as an integral of an objective function that comprises at least one trajectory determined in the simulation,
  d) iteratively repeating steps a) through c) with an optimisation module varying the trajectory of input values $u(\tau)$) until, for a trajectory of optimal control values ($u^*(\tau)$), an optimised lower value of the cost function ($J[u], J[P]$) is arrived at,
  wherein in step b), a lifetime trajectory $LTp(\tau)$ of individual physical plant components is determined from the trajectory of input values $u(\tau)$) and wherein in step c), the cost function ($J[u], J[p]$) comprises the term:

$$\int_t^{t+T} \| R_{LT}(\tau)(LTn(\tau) - LTp(\tau)) \| d\tau,$$

wherein $LTn(\tau)$ is a nominal lifetime trajectory of the individual physical plant components, $R_{LT}$ is a weighting matrix for determining a relative influence of each of the physical plant components, t is a present time, and T is a predetermined duration; and e) applying at least one optimal control value ($u^*(t)$) to the power plant to influence lifetime consumption of the individual physical plant components.

11. A power plant optimising system for optimal operation of a power plant that comprises:

a) a simulation module that is configured to determine, from a trajectory of input values, by simulation of the power plant's behaviour, corresponding trajectories of process variables;

b) an optimisation module that is configured to determine a plurality of trajectories of input values and to determine a value of a cost function as an integral of an objective function, which objective function comprises at least one trajectory determined by the simulation module, wherein the simulation module is configured to determine, from the trajectory of input values, a lifetime trajectory $LTp(\tau)$ of individual physical plant components, wherein the cost function comprises the term;

$$\int_t^{t+T} \| R_{LT}(\tau)(LTn(\tau) - LTp(\tau)) \| d\tau,$$

wherein $LTn(\tau)$ is a nominal lifetime trajectory of the individual physical plant components, $R_{LT}$ is a weighting matrix for determined a relative influence of each of the physical plant components, t is a present time, and T is a predetermined duration, and wherein the optimisation module is configured to apply at least one optimal control value to the power plant to influence lifetime consumption of the individual physical plant components.

* * * * *